United States Patent
Michel et al.

Patent Number: 5,113,066
Date of Patent: May 12, 1992

[54] INTEGRATED OPTICAL SENSOR ARRANGEMENT WITH DETECTING MEANS, AND MEANS FOR CONTROLLING THE OPTICAL EMISSION WAVELENGTH OF THE LIGHT BEAM SOURCE

[75] Inventors: Dieter Michel, Traunstein; Andreas Franz, Kienberg, both of Fed. Rep. of Germany

[73] Assignee: Dr. Johannes Heidenhain GmbH, Traunreut, Fed. Rep. of Germany

[21] Appl. No.: 681,883

[22] Filed: Apr. 8, 1991

[30] Foreign Application Priority Data

Apr. 11, 1990 [DE] Fed. Rep. of Germany ........ 401178

[51] Int. Cl.⁵ .............................................. G01J 1/32
[52] U.S. Cl. ............................. 250/205; 250/237 G; 250/231.16
[58] Field of Search ......... 250/237 G, 231.16, 231.14, 250/208.1, 205; 356/350; 385/11, 12, 14

[56] References Cited

U.S. PATENT DOCUMENTS

| | | |
|---|---|---|
| 3,674,335 | 7/1972 | Ashkin et al. |
| 4,403,352 | 9/1983 | Huignard et al. ............... 250/237 G |
| 4,724,314 | 2/1988 | Caimi ................................. 250/205 |
| 4,815,081 | 3/1989 | Mahlein et al. |
| 4,938,595 | 7/1990 | Parriaux et al. |
| 4,954,786 | 9/1990 | Yamakawa et al. ................. 250/205 |
| 4,998,043 | 3/1991 | Unami et al. ....................... 250/205 |

*Primary Examiner*—David C. Nelms
*Assistant Examiner*—T. Davenport
*Attorney, Agent, or Firm*—Willian Brinks Olds Hofer Gilson & Lione

[57] ABSTRACT

In an integrated optical arrangement, such as a photoelectric position measuring arrangement, a diffraction grid is scanned by light beam diffraction by a scanning unit having a laser. A light beam bundle emanating from the laser is split by the diffraction grid into two diffraction beam bundles, which are inserted into the top input waveguides of a waveguide coupler by two coupling elements. The two diffraction beam bundles interfere in the waveguide coupler and impinge on three detectors located at three output waveguides of the waveguide coupler for obtaining measured values. For readjustment of the optimal emission wavelength of the laser, an additional diffraction beam bundle emanating from the diffraction grid is entered into said integrated optical sensor arrangement by an additional coupling element. The additional beam bundle triggers a detector for generating a control signal to control the optimal emission wavelength of the laser.

13 Claims, 2 Drawing Sheets

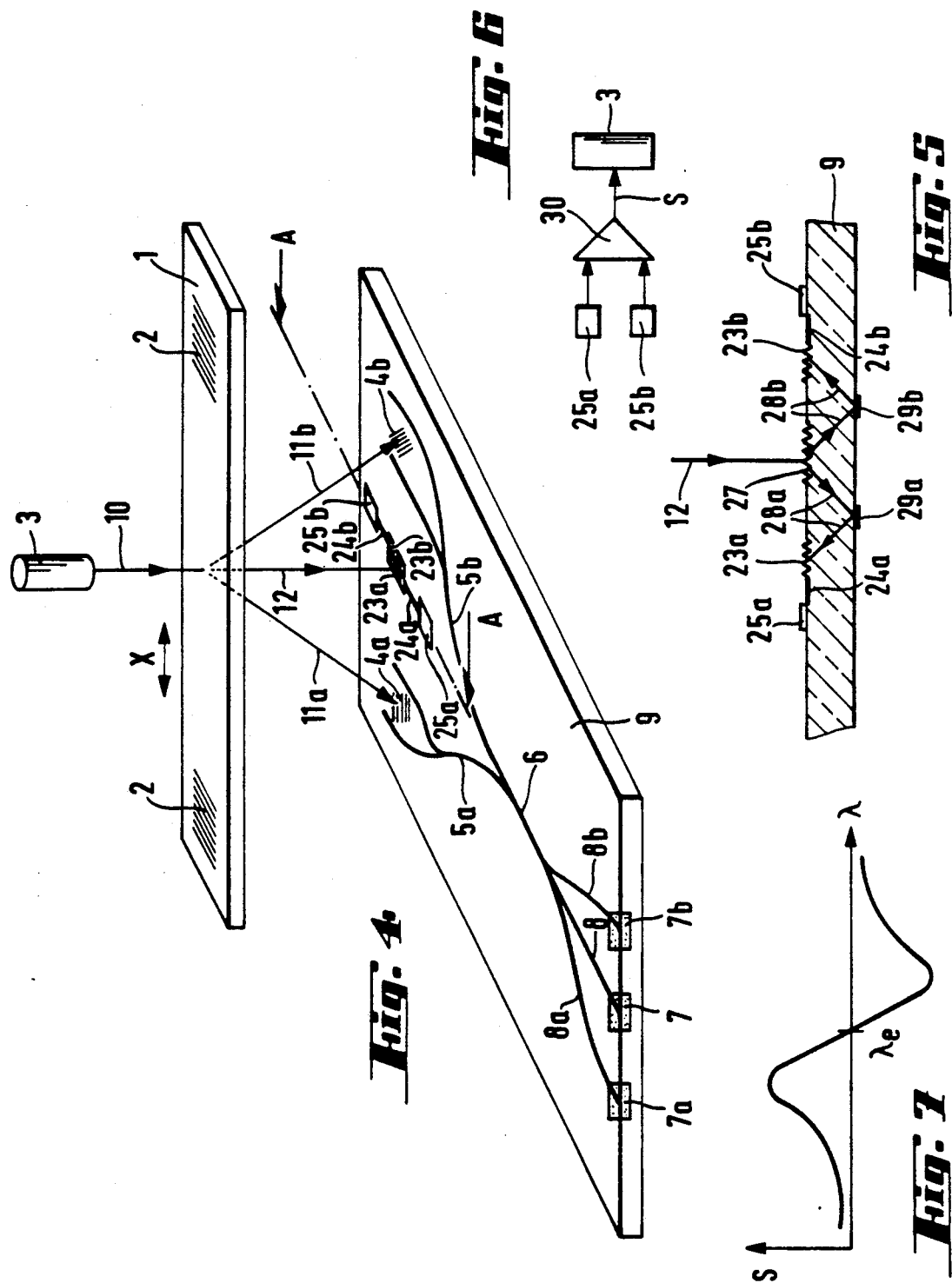

INTEGRATED OPTICAL SENSOR ARRANGEMENT WITH DETECTING MEANS, AND MEANS FOR CONTROLLING THE OPTICAL EMISSION WAVELENGTH OF THE LIGHT BEAM SOURCE

BACKGROUND OF THE INVENTION

Description of the Prior Art

The present invention is directed to a position measuring device and more particularly to a position measuring device using an integrated optical sensor arrangement.

Position measuring arrangements are used with machine tools, for example, to measure the relative position of a tool with respect to a workpiece being processed by the tool. U.S. Pat. No. 4,938,595 based upon German Letters Patent DE-PS 36 25 327 discloses a photoelectric position measuring arrangement for measuring the relative position of two objects. A scale connected with one object and equipped with a diffraction grid is scanned by a scanning unit having a semiconductor laser. An integrated optical device located on a substrate is connected with the other object. The integrated optical device includes two coupling elements in the form of two horn-shaped diffraction grids located at two input waveguides of a waveguide coupler. Also included are three detectors located at three output waveguides of the waveguide coupler. The light beam bundle emitted from the semiconductor laser is diffracted by the diffraction grid of the scale into two diffraction beam bundles of the same order but with opposite signs. The diffraction beam bundles enter the two input waveguides by means of the two coupling elements. The diffracted beam bundles interfere with each other in the waveguide coupler and subsequently impinge the three detectors located at the three output waveguides. Periodic scanning signals are generated from the detectors, the signals being phase displaced with respect to one another. The measured values for the relative position of the two objects are obtained from these signals in a manner known to those skilled in the art.

Accurate operation of an integrated optical device of this type requires the emission wavelength of the laser, the grid parameters of the coupling elements, the diffraction indices of the waveguides and the ambient media to be adjusted with respect to each other. To assure accurate operation, it is necessary to set an optimal emission wavelength in the laser and to maintain this optimal emission within a tolerance of $10^{-3}\lambda$. This optimal setting is disturbed, however, if there is a change in the ambient conditions particularly temperature changes. Disturbance of the optimal emission wavelength are undesirable since it results in measurement errors.

A device for controlling or regulating the emission wavelength and the emitted optical output of a semiconductor laser is known from U.S. Pat. No. 4,815,081 based upon EP-A1-0 284 908. The control or regulation of the emission wavelength and the emitted optical output is performed simultaneously. The optical output emitted by the laser is partially fed to a first detector arrangement and subsequently, via at least one Bragg grid or a directional coupler acting as filter element, to a second detector arrangement. The two detector arrangements simultaneously measure the optical output and the emission wavelength of the laser and simultaneously generate therefrom two control signals for the injection current of the laser.

SUMMARY OF THE INVENTION

The present invention provides an integrated optical sensor arrangement, preferably a photoelectric position measuring arrangement, in which errors caused by unavoidable variations in the manufacturing tolerances and changes in the properties of the materials or the effects of the environment are avoided to the greatest extent possible.

This is attained in accordance with the present invention where an additional diffraction beam bundle emanating from the graduation is inserted by at least one additional coupling element into at least one additional waveguide for triggering at least one additional detector, which generates a control signal for controlling the optimal emission wavelength of the laser beam source.

An advantage of the present invention is the simple readjustment of the optimum emission wavelength of the semiconductor laser so that the integrated optical sensor arrangement permits dependent operation with a high measuring accuracy regardless of disadvantageous external effects.

Another advantage of the present invention consists in the creation of an integrated optical sensor arrangement containing coupling elements dimensioned in the same way as the coupling elements of the prior art mentioned above applied to the same substrate and produced according to the same process steps, which are affected in the same way by changes in the environmental conditions such as temperature and humidity.

BRIEF DESCRIPTION OF THE DRAWINGS

FIG. 4 illustrates a integrated optical sensor arrangement according to a second preferred embodiment of the present invention;

FIG. 5 illustrates a partial cross-sectional view of an integrated optical sensor arrangement according to a third preferred embodiment of the present invention of FIG. 4;

FIG. 6 illustrates a second control circuit in accordance with either FIG. 4 or 5; and FIG. 7 illustrates a second signal diagram in accordance with FIG. 4.

DETAILED DESCRIPTION OF THE PRESENTLY PREFERRED EMBODIMENTS

Figure 1:
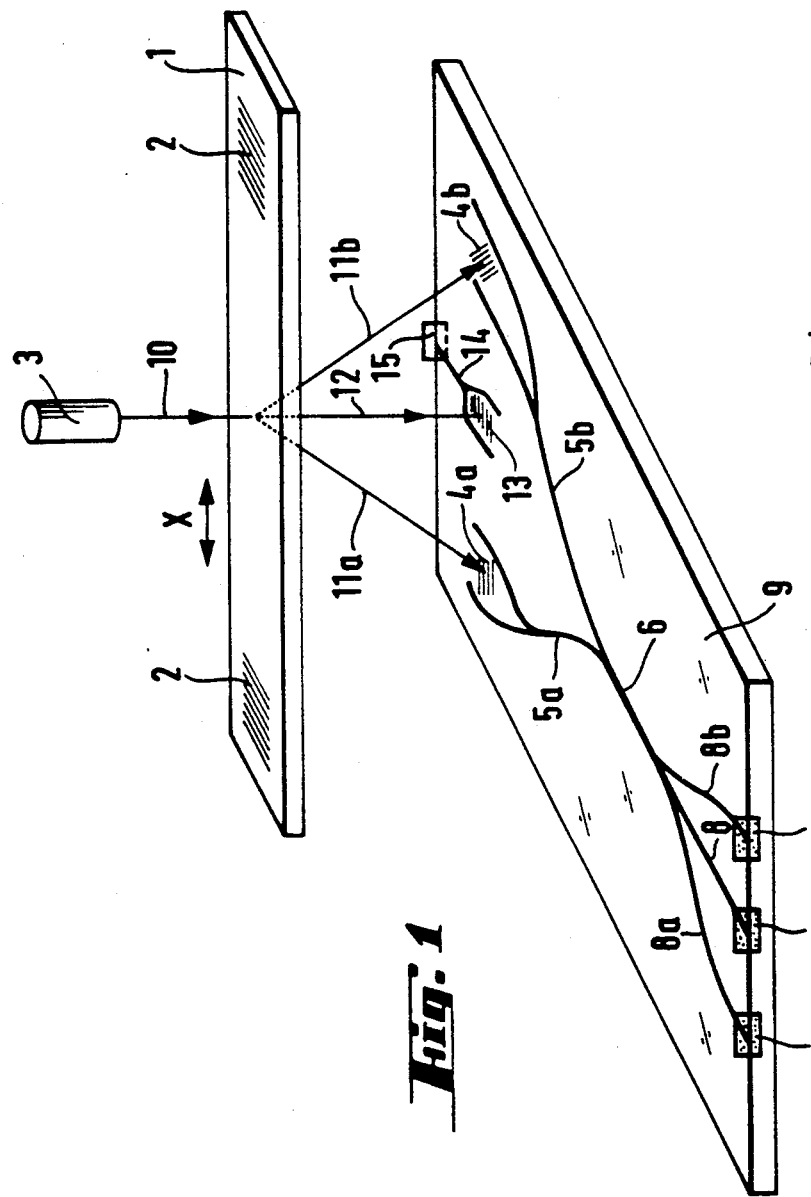
FIG. 1 illustrates an integrated optical sensor arrangement according to a first preferred embodiment of the present invention.

FIG. 1 illustrates a first integrated optical sensor arrangement in the form of a photoelectric length measuring arrangement. The arrangement is used to measure the relative position of two objects (not shown) movable with respect to one another, for example, the position of a machine tool with respect to a workpiece. A scale 1 connected with one object is equipped with an incremental graduation 2 in the form of a diffraction grid. The graduation 2 is scanned by light transmitted from a scanning unit having a light source 3 in the form of a semiconductor laser. An integrated optical circuit is located on a substrate 9. The integrated optical circuit includes two coupling elements 4a and 4b in the form of two diffraction grids located at two input waveguides 5a and 5b of a waveguide coupler 6. In addition, three photoelectric detectors 7, 7a and 7b are located at three output waveguides 8, 8a and 8b of the waveguide coupler 6.

The components employed may comprise those commonly known in the art. The components of the optical circuit may also comprise fiber optics, the use of which, however, does not necessitate additional exemplary drawings. Those skilled in the art will readily understand and recognize such an arrangement containing corresponding fiber optic components.

A light beam bundle 10 emitted by the semiconductor laser 3 impinges vertically on the scale 1 and is split by the diffraction grid of graduation 2 into a positive diffraction beam bundle 11a and a negative diffraction beam bundle 11b. Beam bundles 11a and 11b are of the first order. The two diffraction beam bundles 11a and 11b enter the input waveguides 5a and 5b by means of the two coupling elements 4a and 4b. The two diffraction beam bundles 11a and 11b are brought to interference in the waveguide coupler 6. Optical signals are supplied to the photoelectric detectors 7, 7a and 7b by the associated three output waveguides 8, 8a and 8b. Relative movement of the two objects causes the scale 1 and the scanning unit to move in the direction of measurement X. The three photoelectric detectors 7, 7a and 7b generate three periodic scanning signals with a reciprocal phase offset of 120° from which the measured values of the relative position of the two objects are obtained in a known manner. Such a position measuring arrangement has been described, for example, in previously mentioned U.S. Pat. No. 4,938,595 which is incorporated herein by reference.

Accurate operation of the position measuring arrangement requires the emission wavelength λ of the light source to be maintained within an allowed tolerance. To control the emission wavelength of the light source an additional coupling element 13 in the form of a diffraction grid, an additional waveguide 14 as well as an additional photoelectric detector 15 are located on the substrate 9. An additional diffraction beam bundle 12, for example of zero order, generated from the light beam bundle 10 of the semiconductor laser 3 by the diffraction grid of the graduation 2, is entered by means of the coupling element 13 into the waveguide 14 for triggering the photoelectric detector 15. The additional diffraction beam bundle 12 is split into beams of various diffraction orders by the coupling element 13. The direction of the individual diffraction order beams are a function of the wavelength λ of beam 12. If the beam direction is 90°, the full intensity of the beam is switched into the waveguide 14. If the beam direction is other that 90°, only a portion of the full intensity of the beam is switched into the waveguide 14. Thus, the total intensity of the light switched into and guided in the waveguide 14 will change as a function of the wavelength λ of the beam 12. Therefore, the additional diffraction beam bundle 12 is more or less entered by coupling element 13 depending on the beam's wavelength.

Figure 2:
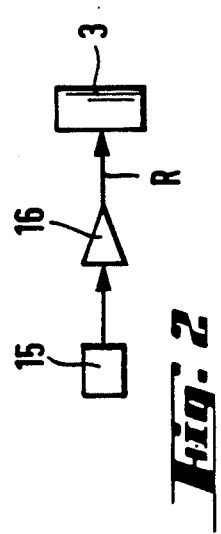
FIG. 2 illustrates a first control circuit in accordance with FIG. 1.

FIG. 2 illustrates a first control circuit in accordance with the measuring arrangement shown in FIG. 1. The photoelectric detector 15, together with an amplifier 16 switched downstream of the detector, supplies a control signal R for regulating the emission wavelength λ of the semiconductor laser 3 in order to readjust the optimal emission wavelength $\lambda_e$ of the semiconductor laser 3.

The optimal emission wavelength $\lambda_e$ which is set under normal conditions, will change when changes occur in environmental conditions particularly temperature changes.

Figure 3:
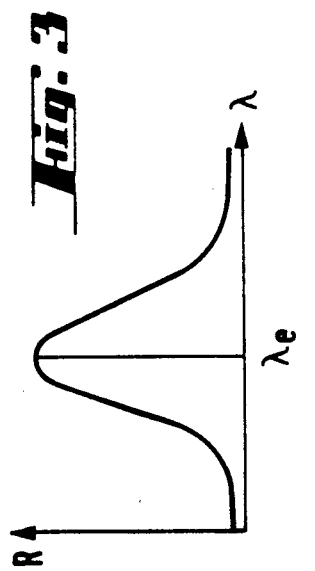
FIG. 3 illustrates a first signal diagram in accordance with FIGS. 1 and 2.

FIG. 3 illustrates a first signal diagram in accordance with the measuring arrangements shown in FIGS. 1 and 2. The signal diagram schematically represents the intensity of the light reaching the photoelectric detector 15 as a function of the wavelength λ. The emission wavelength λ of the semiconductor laser 3 is adjusted as a function of this intensity. The maximum of the signal R is located at the optimal emission wavelength $\lambda_e$ of the semiconductor laser 3.

FIG. 4 illustrates a second integrated optical sensor arrangement in the form of a photoelectrical length measuring arrangement. Elements in FIG. 4 which correspond to elements shown in FIG. 1 have the same reference numerals.

In contrast to the sensor arrangement shown in FIG. 1, two additional coupling elements 23a and 23b in the form of diffraction grids, two additional planar waveguides 24a and 24b as well as two additional photoelectric detectors 25a and 25b are disposed on the substrate 9. The diffraction beam bundle 12, for example of zero order, generated from the light beam bundle 10 of the semiconductor laser 3 by the diffraction grid of the graduation 2, is entered by means of the two additional coupling elements 23a and 23b into the two waveguides 24a and 24b for triggering the two photoelectric detectors 25a and 25b. The diffraction beam bundle 12 is entered by coupling elements 23a and 23b, more or less, depending on the beam's wavelength, as previously explained.

FIG. 5 illustrates a partial cross-sectional view of an integrated optical sensor arrangement according to a third preferred embodiment of the present invention. An additional diffraction grid 27 is disposed on the substrate 9 of the position measuring arrangement shown in FIG. 4. Diffraction grid 27 is arranged symmetrically with respect to the two coupling elements 23a and 23b in the form of diffraction grids. Two waveguides 24a and 24b as well as the two photoelectric detectors 25a and 25b are located on substrate 9.

An additional diffraction beam bundle 12 of zero order generated from the light beam bundle 10 of the semiconductor laser 3 by the diffraction grid of the graduation 2, is diffracted by the additional diffraction grid 27 into two partial beam bundles 28a and 28b of equal intensity. After having been reflected by two mirrors 29a and 29b on the underside of the substrate 9, these two partial beam bundles 28a and 28b are entered by means of the two coupling elements 23a and 23b, more or less, depending on their wavelength, into the two waveguides 24a and 24b for triggering the two photoelectric detectors 25a and 25b.

The advantage of using a diffraction grid 27 eliminates problems caused by the differing intensity distribution over the cross section of the beam 12. In FIG. 4, the two coupling elements 23a and 23b are placed side by side. The beam 12 is entered onto the substrate at two different locations. With a differing intensity distribution over the cross section of the beam 12, more intensity reaches the grid 23a than the grid 23b. The diffraction grid 27 splits the beam 12 into two beams 28a and 28b having even intensity distributions. The different intensity distribution over the cross section of the beam 12 affects the two partial beams 28a and 28b in the same way. Thus the signal S generated by the differential amplifier 30 is a correct signal for affecting the laser 3.

The grid constants of the two coupling elements 23a and 23b have been selected to be different with one grid constant being slightly larger and the other grid constant being slightly smaller with respect to the optimal emission wavelength $\lambda_e$ of the semiconductor laser 3 under normal conditions. By selecting the grid constants to be either slightly larger or slightly smaller than the optimal emission wavelength $\lambda_e$, the two additional coupling elements 23a and 23b only efficiently couple in connection with wavelengths which are slightly greater or slightly smaller with respect to this optimal emission wavelength $\lambda_e$. The difference between the outputs entered by the two additional coupling elements 23a and 23b is used as a measure of the deviation of the emission wavelength $\lambda$ of the semiconductor laser 3 from the optimal emission wavelength $\lambda_e$ during changes in the environmental conditions. Because the grid constants of the two coupling elements 23a and 23b are chosen to be different, the maximum strength of the intensity signal received by photodetector 25a lies at a different wavelength than the maximum strength of the intensity signal received by the photodetector 25b.

FIG. 6 illustrates a second control circuit wherein the output signals of the two additional photoelectric detectors 25a and 25b are supplied to a differential amplifier 30 for the generation of a signal S for controlling the optimal emission wavelength $\lambda_e$ of the semiconductor laser 3. The control circuit takes the difference between the two intensity signals received by photodetectors 25a and 25b. The difference between these two intensity signals results in signal S which has a zero value at the optimal emission wavelength $\lambda_e$. This value is retained even if the intensity of the emission of the laser 3 changes. The advantage of using two coupling elements 23a and 23b over one coupling element 13 shown in FIG. 1 is that the signal S from which a control signal is derived is independent of the intensity of the laser 3. The signal R shown in FIG. 3 is dependent upon the intensity of the laser 3.

FIG. 7 illustrates a second signal diagram. The signal diagram schematically represents the intensity of the light reaching the photoelectric detectors 25a and 25b as a function of the wavelength $\lambda$. The emission wavelength $\lambda$ is adjusted as a function of this intensity. The optimal emission wavelength $\lambda_e$ is located at the crossover of the signal S. A control signal which directly affects the laser 3 is derived from the signal S.

The two coupling elements 23a and 23b may have the same grid constants if the diffraction beam bundle 12 does not impinge vertically.

The invention can also be successfully employed in connection with an integrated optical sensor arrangement in the form of a photoelectrical angle measuring arrangement as known to those skilled in the art.

While this invention has been shown and described in connection with preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. An integrated optical sensor arrangement for controlling the optimal emission wavelength of a light beam source comprising:

a graduation scale for diffracting a light beam from said source into diffraction beam bundles;

means for coupling at least one diffracted beam to a waveguide coupler;

means for coupling an additional diffraction beam bundle to said integrated optical sensor; and means for detecting and generating a control signal for controlling the optimal emission wavelength of said light beam source.

2. An integrated optical sensor arrangement for controlling the optimal emission wavelength of a light beam source comprising:

a graduation scale for diffracting a light beam from said source into diffraction beam bundles;

means for coupling said diffracted beams to a waveguide coupler wherein said diffracted beams are brought into interference;

means for detecting said interference and generating measure values;

means for coupling an additional diffraction beam bundle to said integrated optical sensor; and means for detecting and generating a control signal for controlling the optimal emission wavelength of said light beam source.

3. An arrangement according to claim 1 or 2 wherein said means for coupling said additional diffraction beam bundle comprises at least one coupling grid.

4. An arrangement according to claim 1 or 2 wherein said means for coupling said additional diffraction beam bundle comprises two coupling grids.

5. An arrangement according to claim 4 wherein said two coupling grids have different grid constants.

6. An integrated optical sensor arrangement for controlling the optimal emission wavelength of a light beam source comprising:

a graduation scale for diffracting a light beam from said source into diffraction beam bundles;

means for coupling at least one diffracted beam to a waveguide coupler;

means for coupling an additional diffraction beam bundle to said integrated optical sensor;

means for diffracting said additional beam bundle into partial beam bundles;

means for coupling said partial bundles from said additional beam bundle to said integrated optical sensor; and means for detecting said coupled partial beam bundles from said additional beam bundles and generating a control signal for controlling the optimal emission wavelength of said light beam source.

7. An integrated optical sensor arrangement for controlling the optimal emission wavelength of a light beam source comprising:

a graduation scale for diffracting a light beam from said source into diffraction beam bundles;

means for coupling said diffracted beams to a waveguide coupler wherein said diffracted beams are brought into interference;

means for detecting said interference and generating measure values;

means for coupling an additional diffraction beam bundle to said integrated optical sensor;

means for diffracting said additional beam bundle into partial beam bundles;

means for coupling said partial bundles from said additional beam bundle to said integrated optical sensor; and means for detecting said coupled partial beam bundles from said additional beam bundles and generating a control signal for controlling the optimal emission wavelength of said light beam source.

8. An arrangement according to claim 6 or 7 wherein said means for generating a control signal comprises a differential amplifier connected to said means for detecting.

9. An arrangement according to claim 6 or 7 wherein said coupled diffraction beam bundles are of equivalent intensity.

10. A method of controlling the optimal emission wavelength of a light beam source in an integrated optical sensor arrangement comprising the steps of:
   diffracting a beam of light from said source on a graduation scale;
   coupling said diffracted beams to a waveguide coupler causing said diffracted beams to interfere;
   detecting said interference and generating measured values;
   coupling an additional diffraction beam bundle to said integrated optical sensor; and
   detecting said additional beam bundle and generating a control signal for controlling the optimal emission wavelength of said light beam source.

11. A method according to claim 10 wherein said additional diffraction beam is coupled by at least one coupling grid.

12. A method according to claim 10 wherein said additional diffraction beam is coupled by two coupling grids.

13. A method of controlling the optimal emission wavelength of a light beam source in an integrated optical sensor arrangement comprising the steps of:
   diffracting a beam of light from said source on a graduation scale;
   coupling said diffracted beams to a waveguide coupler causing said diffracted beams to interfere;
   detecting said interference and generating measured values;
   diffracting said additional beam bundle into partial beam bundles;
   coupling said partial beam bundles from said additional beam bundle to said integrated optical sensor; and
   detecting said coupled partial beam bundles from said additional beam bundle and generating a control signal for controlling the optimal emission wavelength of said light beam source.

* * * * *

UNITED STATES PATENT AND TRADEMARK OFFICE
CERTIFICATE OF CORRECTION

PATENT NO. : 5,113,066

DATED : May 12, 1992

INVENTOR(S) : Dieter Michel Et Al.

It is certified that error appears in the above-identified patent and that said Letters Patent is hereby corrected as shown below:

IN THE ABSTRACT

In line 1, after "optical" please insert --sensor--.

In line 6, please delete "top" and substitute therefor --two--.

Signed and Sealed this

Twelfth Day of April, 1994

Attest:

BRUCE LEHMAN

Attesting Officer

Commissioner of Patents and Trademarks